UNITED STATES PATENT OFFICE.

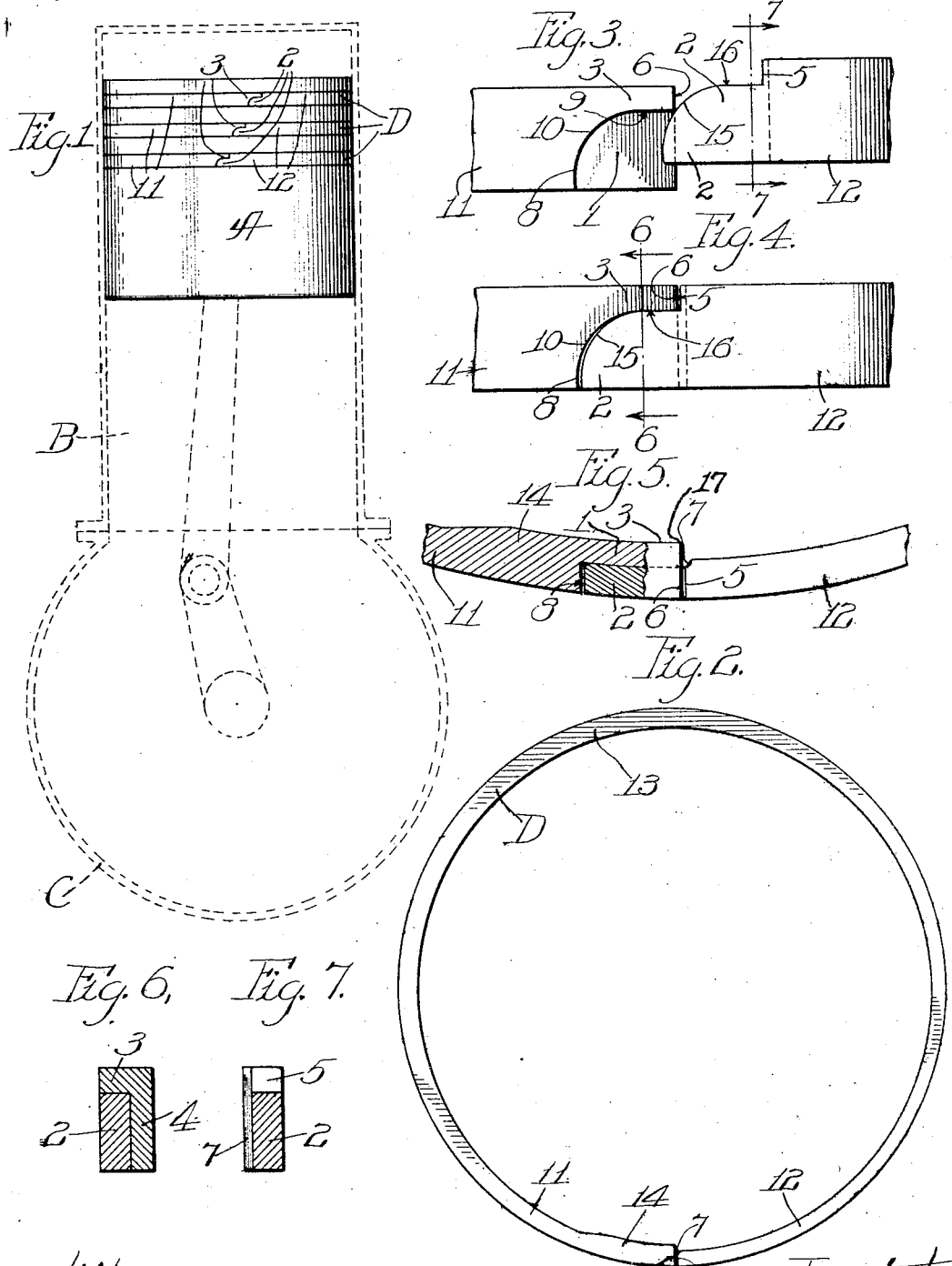

ALEXANDER W. HILKER, OF CHICAGO, ILLINOIS.

PISTON-RING.

1,274,038.  Specification of Letters Patent.  Patented July 30, 1918.

Application filed November 1, 1917. Serial No. 199,623.

*To all whom it may concern:*

Be it known that I, ALEXANDER W. HILKER, a citizen of the United States of America, and resident of Chicago, county of Cook, and State of Illinois, have invented a certain new and useful Improvement in Piston-Rings, of which the following is a specification.

This invention relates to piston rings in general, but more particularly to those for use in connection with internal combustion engines, and especially those which are self-adjusting to take up wear, such as those ordinarily employed for this purpose.

Generally stated, the object of this invention is to provide an improved construction and arrangement which will tend to prevent breakage of the ring, which will prevent leakage, and which will obviate the necessity of using certain features heretofore employed or considered necessary in a ring of this kind, and to provide a novel construction which will tend to insure better results than was possible with certain forms of piston rings heretofore employed.

It is also an object to provide certain details and features of construction tending to increase the general efficiency and desirability of a piston ring of this particular construction.

To the foregoing and other useful ends, my invention consists in matters hereinafter set forth and claimed.

In the accompanying drawings:

Figure 1 is a diagrammatic view of an internal combustion engine provided with a piston having rings embodying the principles of this invention.

Fig. 2 is an enlarged plan view of one of said rings.

Fig. 3 is an enlarged detail view showing the lap-joint between the ends of the ring, and illustrating the manner in which said ends are sprung out of line with each other to insure a tight joint when the ring is compressed.

Fig. 4 is a view similar to Fig. 3, but showing the ring compressed to bring the end portions thereof tightly together, but with slight space left to take up the expansion of the metal when the piston becomes highly heated.

Fig. 5 is a view looking down on the parts shown in Fig. 4, with certain portions shown in horizontal section.

Fig. 6 is a vertical section on line 6—6 in Fig. 4.

Fig. 7 is a vertical section on line 7—7 in Fig. 3.

As thus illustrated, the invention comprises a piston A of any suitable form or character, inclosed in the usual cylinder B having the oil-chamber and crank-case C at the lower end thereof, as is usual in an ordinary combustion engine. The piston may have as many rings D as is necessary or desirable.

Each ring D is preferably constructed as follows:—Referring to Fig. 2, it will be seen that the ring is split at one side, so that end portions are formed, whereby the ring can be sprung into place and then compressed or contracted and held in such condition by the cylindric walls of the cylinder. One end portion has a recess 1 formed in the cylindric outer surface of the ring, and the other end portion is formed with a tongue 2 for insertion said recess. Said recess has a top wall or over-hang 3, and an inner wall 4 (see Fig. 6), and the tongue 2 is of less width than the ring to provide a shoulder 5 which opposes the end 6 of said top wall. An inner shoulder 7 is formed on the end portion having said tongue, and is disposed in position to oppose the end edge of the inner wall 1 when the ring is compressed or contracted to tightly close the lap-joint. It will be seen that the end surface 8 of the recess 1 and the bottom surface 9 of the top wall 3 are connected by an easy curve 10, so that there is no abrupt corner or angle between the surfaces 8 and 9, and so that the top wall 3 is, in effect, gradually widended until it joints the body of the ring. The portions 11 and 12 adjacent the ends of the ring are preferably of less thickness than the portion 13 at the opposite side of the ring, so that the ring is eccentric instead of concentric, and whereby the wear is more equally distributed. It will also be seen that the end portion 14 is of substantial thickness. In this way a space is left behind the portion 12 to receive pressure. Also, by referring to Fig. 3, it will be seen that the two end portions of the ring are sprung out of line with each other so that in normal condition the rounded edge 15 of the tongue 2, which edge has the same curvature as the curve 10, is about in engagement with the corner of the wall 3, whereby compression or contraction of the ring will cause downward deflection of the tongue 2 as it slides into the recess 1, thereby to insure a tight joint between the lower surface 9 and the upper surface 16, in a maner that will be readily understood.

When the ring is contracted as shown in Fig. 4, slight space is left between the shoulder 5 and the end 6, so that the pressure above the piston may enter and pass behind the ring. In this way, the pressure does not tend to break the ring, but is permitted to enter and force the ring outward against the cylindric inner sides of the cylinder. On the other hand, the oil below the piston cannot pass upwardly in undesirable quantities, above the piston, inasmuch as the tongue 2 rests tightly against the wall 4, and the top surface 16 tightly engages the lower surface 9, even when slight space is left between the end surface 8 and the end of the tongue. Again, it will be seen that the curve 10 facilitates the formation of the recess 1, as it is comparatively easy to form this curve with the tools ordinarily employed for cutting and forming rings of this kind. It will be understood, of course, the ring is preferably made of cast iron, in order not to scratch the surface of the cylinder, and in order to insure the other desirable characteristics, but the metal is sufficiently springy or resilient to keep the ring sprung outwardly and tightly against the inner surface of the cylinder. With the methods ordinarily employed, it would be difficult and practically impossible to form an abrupt corner or sharp angle in place of the curve 10, and it would be difficult to make the tongue correspondingly fit such a recess; but, with the formation shown and described, the curve 10 can be easily formed, and the corresponding curve 15 can also be accurately formed with the tools ordinarily employed for this purpose, so that when the ring is fully contracted a perfectly tight joint will be formed. Again, the curve 10 serves to prevent breakage of the ring, for with an abrupt or sharp corner in place of this curve breakage at this point would be liable to occur, and the top wall 3 would very easily break off, for an abrupt or sharp corner would constitute an easy starting place for a fracture; but with the curve 10 there is no point at which such a fracture can start, and breakage is not liable to occur. The ring is designed to be used in the position shown—that is to say, with the wall 3 uppermost, for this brings the space between the shoulder 5 and the end surface 6 uppermost, as the ring gradually wears and expands, and insures better results than would be the case if the ring were turned upsidedown. When the metal of the ring expands, after becoming thoroughly heated, the joint between the two end portions thereof is tightly closed—that is to say, this is possible while the ring is new; but after the ring is somewhat worn, a slight space will then appear between the two end portions, as shown in Figs. 4 and 5, but these spaces are so located that the oil will be kept below the piston, so that the ring will wipe the interior of the cylinder clean upon each downward stroke of the piston, and any pressure above the piston that finds its way downward to the ring will enter in a way that will not be liable to produce breakage of the ring, and will simply press the ring outward against the sides of the cylinder.

It will be understood, of course, that in practice the ends of the ring can be so formed that the shoulder 5 will tightly engage the end 6 of the wall 3 at the same time that the end of the tongue 2 tightly engages the end surface 8 and the curve 10 of the recess; but, with a view to maintaining a slight space for entrance of pressure in side of the ring, the end portions of the ring can be so relatively formed that slight space will be left between the shoulder 5 and the end 6 of the wall 3 when the end of the tongue 2 tightly engages the end surface 8 and the curve 10 of the recess, whereby there will always be a slight space at the top of the ring through which the pressure can enter behind the ring.

It will also be seen that the shoulder 7 is preferably sloping or beveled or, as shown, slightly concave, when the ring is viewed from above (see Fig. 5), so that clearance will be left between this shoulder and the end edge of the wall 1, and whereby breakage or fracture of the metal is less liable to occur. In effect, therefore, regardless of whether this shoulder is flat or slightly concave, the said shoulder is, in effect, inclined away from the tongue 2 on this end of the ring.

The tongue 2, it will be seen, is over twice as high as the overhanging top wall 3, so that the distance from said tongue to the top thereof is substantially greater than the remaining distance to the top of the ring, when the latter is in a horizontal plane, with said wall 3 uppermost. Also, it will be seen that the ring is thicker at the inner edge 17 formed by the inner vertical corner at one end of the ring, than the shoulder 7, adjacent thereto, when the ring is viewed from above, (see Fig. 2 and Fig. 5) so that the inner side of the end portion 12 is held a slight distance from the piston. Again, the vertical ends of the walls 1 and 3 are flush so that this end of the ring is opposed by the straight shoulder 7 on the other end of the ring. With this construction, the metal is distributed in a way that tends to insure against breakage, as well as against leakage, the object being to obtain more satisfactory results than was possible with the constructions heretofore employed for this purpose.

What I claim as my invention is:

1. A resilient metal piston ring for explosion engines, having one end portion thereof provided with an outer recess having a horizontal top wall and an inner vertical wall, said walls extending to the end of the ring, the top wall having an under surface which curves downward to form the end of said recess, and the other end of the ring being provided with a tongue which is rounded to fit said recess, so that the joint line curves upwardly from the bottom of the ring until it extends horizontally a distance and then extends a short distance upward vertically to the top of the ring, the distance from the bottom of said tongue to the top thereof being substantially greater than the remaining distance to the top of the ring.

2. A piston ring as specified in claim 1, the top of said ring being formed with a square shoulder opposite the square end of said top wall, which shoulder is disposed a distance back from the end of said tongue, so that slight space may be left between the ends of the ring at the upper side thereof, the edges of said inner wall being in alinement with said shoulder when the ring is contracted, as and for the purpose described.

3. A piston ring as specified in claim 1, the two adjacent ends of the ring being sprung out of line with each other, and the rounded portion of said tongue being adapted to engage the end of said top wall, and to slide thereon, whereby the ring is flexed to bring said tongue into alinement with said recess, and whereby the ring is placed under tension to keep the top of said tongue pressed tightly against the bottom of said top wall.

4. A resilient metal piston ring having two end portions formed to engage each other to provide a tight joint, said ring being formed with said end portions normally out of line with each other, and having means including a rounded surface on one end to slide under a square corner on the other end to force the two ends into alinement when the ring is contracted, so that the ring is placed under tension to insure a tight joint between the ends thereof, and means on the other end portion to fit said rounded surface.

5. In combination with the piston of an internal combustion engine, a resilient metal ring for said piston, said ring having a thick end portion (14) provided with a recess having an inner wall and another wall extending outward to overhang said recess, this overhanging wall being of less width than said recess, said outwardly extending wall being formed at the side of the ring which is toward the pressure side of the piston, said recess having an open side which faces toward the lubrication side of the piston, and the other end portion (12) of said ring being thinner and formed with a tongue to enter said recess, and with a shoulder (5) which opposes the end (6) of said outwardly extending wall of the recess, forming a small opening extending straight through in the plane of said overhanging wall to the piston, with space behind the thinner end portion and with the shoulder (7) thereof at the inner end of said small opening, and a corner (17) on the thick end portion which bears against the piston, so that pressure may enter behind the ring, as and for the purpose set forth.

Signed by me at Chicago, Cook county, Illinois, this 27th day of October, 1917.

ALEXANDER W. HILKER.